Sept. 19, 1961            A. MANY            3,001,135
DEVICE FOR MEASURING ELECTRICAL POWER
Filed May 21, 1958
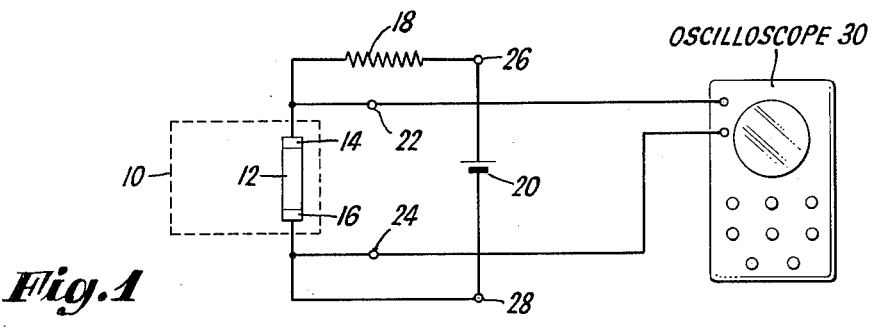
*Fig. 1*
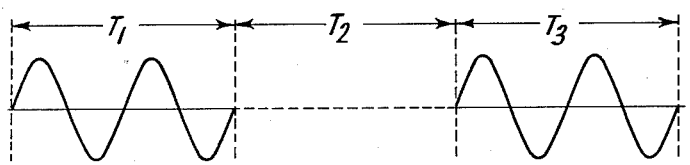
*Fig. 2a*
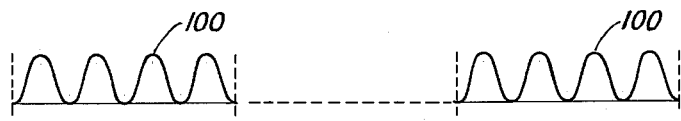
*Fig. 2b*
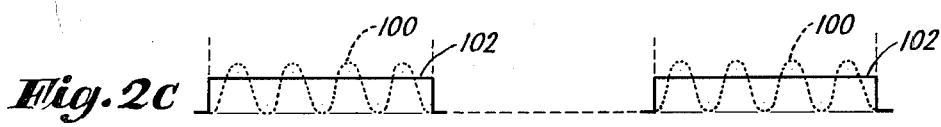
*Fig. 2c*
*Fig. 3*
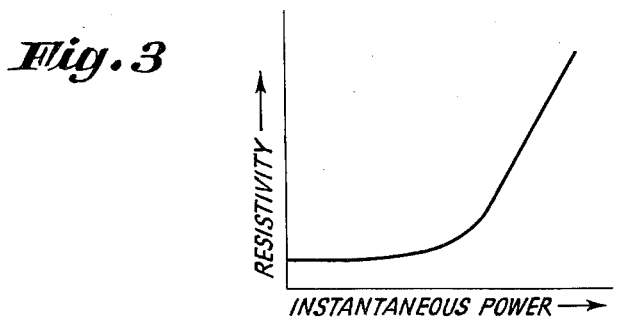
INVENTOR
*ABRAHAM MANY*
BY
ATTORNEY

United States Patent Office 3,001,135
Patented Sept. 19, 1961

3,001,135
DEVICE FOR MEASURING ELECTRICAL POWER
Abraham Many, Jamaica, N.Y., assignor, by mesne assignments, to Sylvania Electric Products Inc., Wilmington, Del., a corporation of Delaware
Filed May 21, 1958, Ser. No. 736,821
2 Claims. (Cl. 324—95)

My invention is directed toward devices for measuring values of electrical power produced at microwave frequencies.

Microwave energy is often supplied to a microwave chamber, such as a cavity or waveguide, during discretely spaced intervals of time; i.e. the energy is supplied discontinuously over a short duty cycle rather than continuously. It is frequently necessary to measure the mean value of the microwave power delivered to the chamber during any such interval, this mean value being referred to hereinafter as the duty cycle mean.

In so far as I am aware, the techniques now known to the art do not permit duty cycle mean values to be measured directly. Instead, the overall average power delivered to the chamber integrated over many cycles is measured by a bolometer or similar instrument and the desired duty cycle mean is computed from these measured parameters. When, as is normally the case, the duty cycle is quite short, the average power values are much smaller than the duty cycle mean. Accordingly, the sensitivity and hence the accuracy of the bolometer type measurements are relatively low.

In contradistinction, I have invented a device which directly measures the duty cycle mean power. As a result, the sensitivity and accuracy of measurement are sharply increased. Further, the response of my device is independent of the duration of the duty cycle. For example, when the duty cycle is indefinitely long, i.e. continuous wave operation, the device will still measure the duty cycle mean power which, in this case, is the overall average power.

In accordance with the principles of my invention, microwave energy is supplied to a microwave chamber, such as a waveguide or cavity, and an electromagnetic field is established within the chamber. A semiconductor body of N or P type conductivity and having first and second spaced apart electrodes secured thereto is inserted within the chamber. The resistivity of this body is not constant, but is determined by the magnitude of the electric field induced in the body, the resistivity of this body, as further discussed below, increasing as this magnitude increases. Means coupled to both electrodes produce an output signal which is uniquely determined by the duty cycle mean power.

When the energy is supplied to the chamber during discretely spaced intervals of time, the output signal assumes the shape of a rectangular pulse whose amplitude defines the duty cycle mean power during each interval.

For continuous wave operation, the output signal is a direct voltage whose amplitude defines the overall average power.

In contradistinction to bolometer type devices, power measurements obtained from the use of my invention are relatively insensitive to variations in ambient temperature, with a corresponding increase in accuracy.

The body can be any semiconductor material of either conductivity type, as long as the material satisfies two requirements. The first requirement is that the material must contain only impurities which give rise to shallow energy levels, and hence contains at most a negligible amount of impurities which give rise to deep energy levels. Stated differently, the concentration of impurities giving rise to deep levels must be smaller by at least one order of magnitude than the concentration of impurities giving rise to shallow levels. The terms shallow and deep energy levels are defined as follows. A level is shallow if its energy separation from either the conduction or valence band edge is of the same order of magnitude as or is smaller than $kT$ where $k$ is Boltzman's constant and T is the operating ambient temperature measured in degrees Kelvin. A level is deep if its energy separation is appreciably larger than $kT$.

The second requirement is that the carrier mobilities in the material decrease with increasing temperature over a range of about 100° C. above the operating temperature.

Germanium doped with elements selected from column III and column V of the periodic table and having a resistivity at room temperature falling within the approximate range 1–50 ohm centimeters is an example of a material satisfying these two requirements.

Since the resistivity of this type of semiconductor body does no remain constant as the magnitude of the electric field in the body changes, the voltage-current characteristics of the body do not obey Ohm's law. This effect can be explained as follows.

When a homogeneous semiconductor body is in thermal equilibrium at a specified temperature and no electric field is applied thereto, the body lattice temperature (which is necessarily the ambient temperature) is equal to a quantity, known as the "electron temperature," which establishes the value of the average energy of the charge carriers in the body. The resistivity of the body is a monotonic function of the electron temperature and increases as the electron temperature increases.

When a small electric field is applied to the body, the average energy of the charge carriers will be substantially unchanged. Hence, the electron temperature will remain constant and the resistivity will not change. Under these conditions, Ohm's law is satisfied.

As the field intensity is increased, the average energy of the charge carriers will be increased. As long as the overall average power level is low, as is usually the case, the lattice temperature will remain substantially the same. However, the electron temperature will increase, and the resistivity will also increase. Hence, as long as the field intensity is high enough to cause variations in the electron temperature, the body resistivity will likewise vary. The body resistivity changes extremely rapidly in response to changes in the electric field, the response time being generally of the order of $10^{-12}$ seconds.

An illustrative embodiment of my invention will now be described with reference to the accompanying drawings wherein FIG. 1 is a schematic diagram of one embodiment of my invention;

FIGS. 2a, 2b, and 2c are waveforms of the input and output signals of the device of FIG. 1; and FIG. 3 is a graph illustrating the type of resistivity power characteristic obtainable from my device.

Referring now to FIG. 1, there is shown a microwave chamber, in this example, a waveguide section 10. Inserted in this section 10 is an elongated body 12 formed from a material of the type previously discussed and having first and second electrodes 14 and 16 secured to the body at spaced apart locations, for example, at opposite ends of body 12. The electrode 14 is coupled to one end of resistor 18 positioned externally of section 10, the other end of resistor 18 being coupled to one side of battery 20. Battery 20 is also positioned externally of section 10. Electrode 16 is coupled to the other side of battery 20. Terminals 22 and 24 are coupled to opposite ends of body 10 and an oscilloscope 30 is coupled to terminals 22 and 24.

The semiconductor body 12 has a resistivity-power characteristic of the type shown in FIG. 3. It will be noted that the resistivity increases monotonically as the power increases. Hence, the instantaneous power can be measured by measuring the value of the instantaneous resistivity, provided that the specific values of this characteristic have been previously determined; i.e., that the body has been previously calibrated. The body is calibrated by applying voltage pulses of known amplitudes directly across the body and measuring its resistance-power characteristic.

In the circuit of FIG. 1, when the value of resistor 18 is high relative to the highest resistivity value of body 12, the current flow through body 12 produced by battery 20 is essentially constant. Then, as the resistivity of body 12 changes, a voltage pulse appears between terminals 22 and 24, the amplitude of this pulse varying in accordance with these changes in resistivity.

Alternatively, when the value of resistor 18 is low relative to the lowest resistivity value of body 12, a voltage pulse will appear between terminals 22 and 24. The amplitude of this pulse varies in accordance with changes in the conductivity of body 12 and hence varies as the reciprocal of the changes in body resistivity.

Further, if desired, the changes in resistivity can be measured, using a simple bridge circuit with an oscilloscope as a null indicator. The power can then be read directly from a calibrated potentiometer on the bridge circuit.

Microwave energy is supplied to the section 10 during discretely spaced time intervals. The duration of $T_1$, $T_3$ of each interval (the duty cycle), for example, can be of the order of $10^{-6}$ seconds, the time separation $T_2$ between adjacent intervals can be, for example, of the order of $10^{-3}$ seconds and the electric field can vary sinusoidally within each interval $T_1$, $T_3$, for example, at a frequency of 3000 megacycles per second, as shown in FIG. 2a.

Since the resistivity of body 12 varies with the magnitude of the electric field and is independent of its polarity, the variations of body resistivity will resemble a rectified signal; however, the waveform will be non-sinusoidal as shown by curve 100 of FIGS. 2b and 2c. The circuitry of the detecting system does not respond to microwave frequencies. Hence, the signal displayed by the oscilloscope will be a rectangular shaped pulse having an amplitude uniquely specifying to the duty cycle mean power during each interval $T_1$, $T_3$, as shown by curve 102 of FIG. 2c.

The semiconductor body can be composed of any semi-conductor material of one or the other conductivity type which has a characteristic of the type shown in FIG. 3 as, for example, germanium, silicon, indium antimonide and the like.

The choice of the material will depend upon the ranges of power to be measured. Power levels as low as milliwatts and as high as hundred of kilowatts can be measured in this manner.

The semiconductor body is sufficiently small relative to the size of the chamber to act as a probe and thus not disturb the electromagnetic field distribution or intensity within the chamber. The power measurements are extremely accurate on the order of one percent or less.

The device described with reference to FIGS. 1 and 2a, 2b, and 2c measures the duty cycle mean power. However, when chamber 10 is continuously supplied with power, the interval $T_1$ will be indefinitely long. Hence, the duty cycle becomes indefinitely long, and the duty cycle mean power is effectively the same as the average power.

Since my device acts as a rectifier, when the duty cycle is indefinitely long and the power delivered to the chamber changes gradually, my device can function as a demodulator, the amplitude of the output signal changing gradually in accordance with the gradual changes in average power.

While I have shown and pointed out my invention as applied above, it will be apparent to those skilled in the art that many modifications can be made within the scope and sphere of my invention.

What is claimed is:

1. In combination with a microwave chamber responsive to incident microwave energy supplied thereto during discretely spaced intervals of time whereby a pulsating electromagnetic field is established within said chamber, means to produce an output signal uniquely identifying the duty cycle mean power during any said interval comprising a semiconductor body of one conductivity type inserted within said chamber and having first and second spaced apart electrodes secured thereto, the resistivity of said body varying in accordance with the instantaneous value of the magnitude of the electric field during any said interval, said resistivity increasing as said value increases.

2. In combination with a microwave chamber responsive to incident microwave energy supplied thereto during discretely spaced intervals of time whereby a pulsating electromagnetic field is established within said chamber, means to produce a rectangular shaped output pulse uniquely identifying the duty cycle mean power during any said interval comprising a semiconductor body of one conductivity type inserted within said chamber and having first and second spaced apart electrodes secured thereto, the resistivity of said body varying in accordance with the instantaneous value of the magnitude of the electric field during any said interval, said resistivity increasing as said value increases, and an oscilloscope, said pulse being applied to the input of said oscilloscope.

References Cited in the file of this patent

UNITED STATES PATENTS

| | | |
|---|---|---|
| 2,590,477 | Weber | Mar. 25, 1952 |
| 2,745,038 | Sziklai | May 8, 1956 |
| 2,760,013 | Peter | Aug. 21, 1956 |

FOREIGN PATENTS

| | | |
|---|---|---|
| 439,457 | Great Britain | Dec. 6, 1935 |